United States Patent Office 2,910,831
Patented Nov. 3, 1959

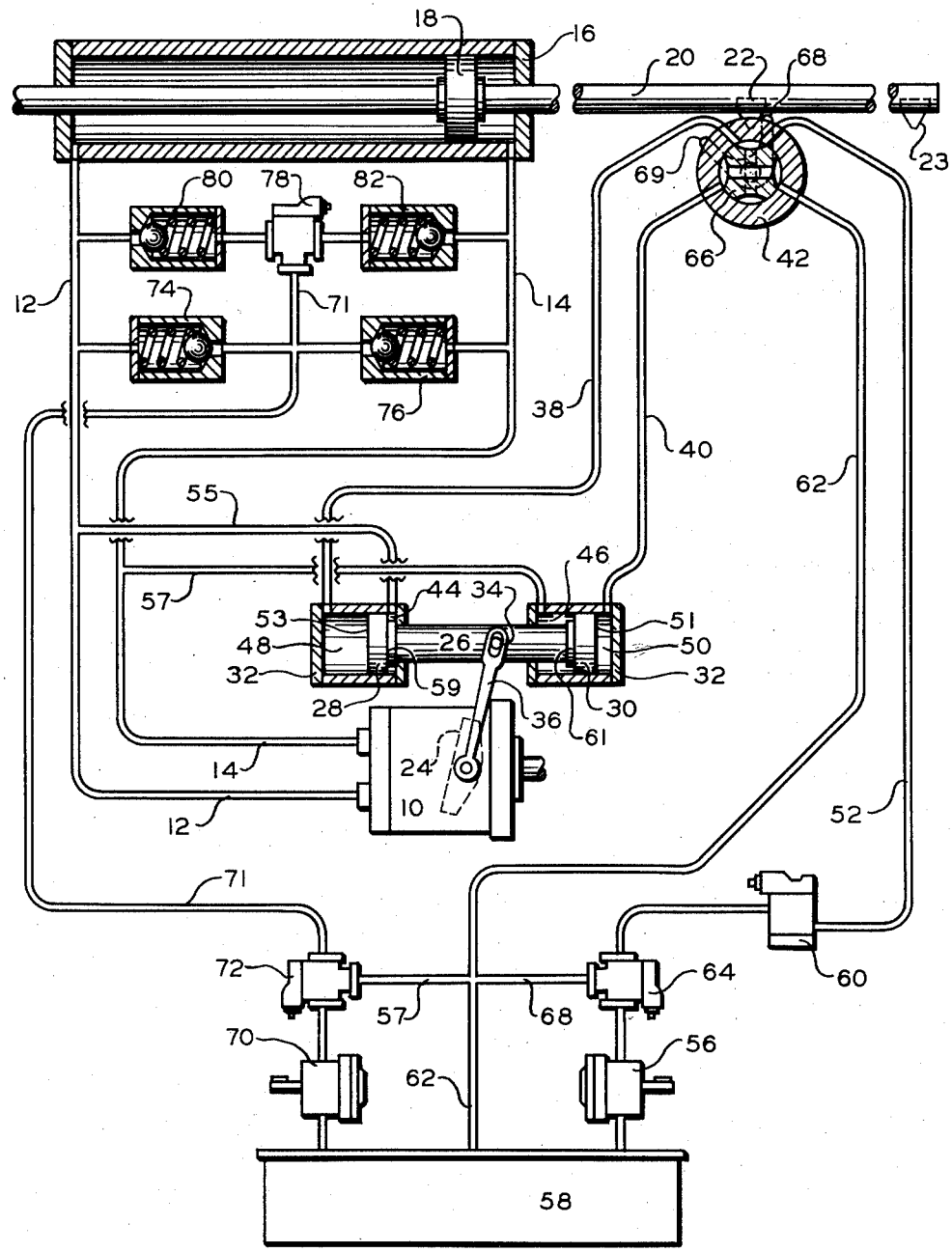

2,910,831

POWER TRANSMISSION

Edward H. Gatwood, Detroit, Mich., assignor to Vickers Incorporated, Detroit, Mich., a corporation of Michigan Application May 16, 1957, Serial No. 659,630

4 Claims. (Cl. 60—52)

This invention relates to power transmissions, and is particularly applicable to those of the type comprising two or more fluid pressure energy translating devices, one of which may function as a pump and another as a fluid motor.

The invention is more particularly concerned with an improved hydraulic power transmission for driving an overrunning load, that is, a load of sizable mass having substantial inertia. In conventional systems, the starting, stopping, and reversal of the motor and its load are often regulated by a directional control valve which may be shifted as a function of the motor position. The use of such a valve may result in shock loading on various elements of the system due to the transient pressures which are generated upon a quick change in the valve's position. The severity of the shock loading will be proportional to the kinetic energy of the moving load and the rate of deceleration.

In the past, deceleration valves and simple relief valves have been utilized for regulating the deceleration rate or limiting the transient pressure peaks. Systems incorporating these valves, although widely used, are often difficult to properly adjust for both maximum efficiency and safety.

It is an object of this invention to provide a hydraulic power transmission system having a reversible fluid motor driving an over-running load wherein deceleration and reversal rates can be regulated for optimum efficiency.

It is another object of this invention to provide such a system in which deceleration and reversing of the motor are controlled by regulation of a variable displacement pump in response to pressure conditions in the system in order to avoid the instantaneous shock-type loads which are frequently encountered in reversing systems, while at the same time accomplishing reversal with maximum speed and efficiency.

Further objects and advantages of the present invention will be apparent from the following description, reference being had to the accompanying drawing wherein a preferred form of the present invention is clearly shown.

In the drawing the single figure is a diagrammatic view of a power transmission system incorporating a preferred from of the present invention.

Referring now to the drawing, there is schematically shown a conventional, reversible, variable displacement pump 10 which has each of its two ports connected by one of the conduits 12 and 14 to one of the two ports of a double acting hydraulic motor 16 having a piston 18 which is driven by fluid supplied by the pump 10. Pump 10 is shown as of the swash plate type, however, any suitable type of reversible, variable displacement pump may be employed.

Motion is transmitted from motor 16 to a machine element through the rod 20. Trip dogs 22 and 23 are located on the rod 20 to effectuate stroke reversal, as will be hereinafter described.

The pump 10 will deliver fluid in a direction and at a rate dependent upon the direction and the distance its swash plate 24 is shifted from its neutral, center position.

In the neutral position of swash plate 24, the displacement of pump 10 will be zero.

A rod 26 may be shifted in either direction by fluid pressure acting upon pistons 28 and 30 located in control cylinders 32. Rod 26 is connected by a pin 34 and lever 36 to the swash plate 24 of pump 10. Fluid for shifting pistons 28 and 30 to vary the position of swash plate 24 is supplied to cylinders 32 from conduits 38 and 40 through a rotary four-way control valve 42 which is shifted by the trip dogs 22 and 23.

Reversal of motor 16 is effected by reversal of delivery of pump 10, under control of cylinder 32. Operation of cylinder 32 depends on the system operating pressure in conduits 12 and 14 which communicate through conduits 55 and 57 with chambers 44 and 46 respectively, of cylinder 32, and a control pressure supplied at an adjustably predetermined setting to chambers 48 and 50 through conduits 38 and 40, respectively.

A control pump 56 draws fluid from the reservoir 58 and discharges it through an adjustable pressure control valve 60 into supply conduit 52. Conduit 52 is provided with a conventional relief valve 64 at a point upstream from valve 60. Valve 64 will pass a portion of the pump delivery to the reservoir 58 through conduits 68 and 62 whenever a predetermined pressure is exceeded. Valve 60 may be adjusted so as to maintain any desired pressure in conduit 52. Conduit 52 leads to the mechanically operated, rotary four-way valve 42, through which it is connected to either conduit 38 or 40, depending upon the position of the spool 66 of the valve 42. Dogs 22 and 23 on rod 20 are in different planes and they contact levers 68 and 69 respectively, which are also in separate planes from one another. Dog 22 operates valve 42 to connect conduits 52 and 40, and 62 and 38, as rod 20 moves rightwardly, by contacting the lever 68 which is connected to the spool 66. Dog 23 operates valve 42 to connect conduits 52 and 38, and 62 and 40, as rod 20 moves leftwardly, by contacting lever 69.

It will be seen from the foregoing that control pressure at a value established by the setting of valve 60 will be transmitted to either chamber 50, where it acts on the area 51 of piston 30, or to chamber 48, where it acts on the area 53 of piston 28, depending upon the position of valve 42. The pressure in conduit 12 is continuously conducted to the chamber 44 through the conduit 55 where it reacts against the small annular area 59 of piston 28. In a similar manner pressure in conduit 14 is continuously conducted through a conduit 57 to the chamber 46 where it reacts against the annulus 61.

A supercharge and replenishing pump 70 communicates through a conduit 71 and a pair of check valves 74 and 76 with the main operating conduits 12 and 14. A relief valve 72 in line 71 limits the supercharge pressure to a small value of the order of 20 p.s.i., for example.

Maximum pressure which can be developed in the conduits 12 and 14 is controlled by a relief valve 78 which, through a pair of check valves 80 and 82, is connected to whichever of the conduits 12 and 14 is at the higher pressure value. Valve 78 is a standby safeguard and is normally closed during all phases of operation of the system.

In operation with the components in the position shown in the drawing, piston 18 is approaching the rightward end of its stroke. The mid cycle operating pressure which exists in conduit 12 acts on the annular area 59 creating a force which tends to reduce the stroke of pump 10. This tendency is opposed by the existence in chamber 48 of the reference pressure maintained by valve 60 acting on the large area 53 of piston 28. Although the reference pressure would normally be lower than the mid cycle operating pressure, the areas 53 and 59 are in a ratio of, say, 10 to 1, and the pump 10 will be held on full stroke.

When the trip dog 22 contacts the lever 68, spool 66 will be shifted so as to vent chamber 48 to tank 58 and to direct the reference pressure from conduit 52 to chamber 50 where it acts on the large area 51 of piston 30 to urge the swash plate of pump 10 in a stroke-reducing direction. Up until this moment, pressure in conduit 12 was driving motor 18 rightwardly and exceeded the pressure in conduit 14. The shifting of swash plate 24 initiated by pilot valve 66 reduces the capacity of pump 10 to receive fluid discharged by motor 16 through the conduit 14. Since the load driven by motor 16 is an overrunning one, pressure in conduit 14 will build up and exceed that in conduit 12. The increased motor discharge pressure in conduit 14 acts on the piston 18 so as to effect deceleration of the load. The discharge pressure of motor 16 existing in conduit 14 is conducted through conduit 57 to chamber 46, where it acts on the annulus 61 in opposition to the reference pressure in chamber 50. It will be seen that when the pressure in chamber 46 reaches a predetermined magnitude relative to the reference pressure in chamber 50, the force on piston 30 will be balanced and stroke reduction will be checked.

In this manner the rate of stroke reduction, or the reversal rate, of the pump is modulated as a function of the differential between the motor discharge pressure and the reference pressure.

To consider a particular case, let us assume that it is desired to limit load deceleration to that which will result from maintaining 5000 p.s.i. discharge pressure on motor 16. Assume further that the areas 51 and 61 are in the ratio of 10 to 1. Pressure control valve 60 is now set to maintain a pressure of 500 p.s.i. in line 52. When valve spool 66 is shifted by trip dog 22 the 500 p.s.i. reference pressure will be ported to chamber 50 and act on area 51 so as to reduce the stroke of pump 10. The resulting increased pressure in conduit 14 will be conducted to chamber 46 and act in opposition to the reference pressure in chamber 50. Since areas 51 and 61 are in the ratio of 10 to 1 the motor discharge pressure will rise to 5000 p.s.i. and will be maintained at that value during deceleration, due to modulation of the pump reversal rate.

Similarly, it will be seen that after motor 16 has been stopped, the acceleration in the leftward direction will be controlled by modulation of the rate of displacement increase after the swash plate has passed the neutral central position.

It will be apparent that the reversal at the leftward end of the stroke of motor 16 will be controlled in the same manner, except that the modulation of the pump reversal rate will be a function of the differential between the discharge pressure of motor 16 existing in conduit 12 and chamber 44 and the reference pressure in chamber 48.

If it is desired to decelerate the load more rapidly, valve 60 would be adjusted to increase the reference pressure, and vice versa. In the foregoing description of the operation of the system the existence of supercharge pressure in the non-working one of chambers 44 and 46 has not been considered due to its very small magnitude. However, its presence should not be overlooked.

It will be seen from the foregoing that applicant has provided a hydraulic power transmission for reversibly driving an inertia load in which the reversal is smoothly effected and in which the reversal rate is easily adjusted to compensate for various load magnitudes or discharged operating characteristics.

While the form of embodiment of the invention as herein disclosed constitutes a preferred form, it is to be understood that other forms might be adopted, all coming within the scope of the claims which follow.

What is claimed is as follows:

1. In a hydraulic power transmission for reversibly driving a load, the combination of: a fluid motor coupled to said load and having a pair of ports; a reversible, variable displacement pump having a pair of ports, one communicating with each of said motor ports; a source of reference pressure; and an actuator for controlling the displacement of said pump, said actuator being responsive to the differential between the fluid motor discharge pressure and the reference pressure to modulate the reversal rate of said pump.

2. In a hydraulic power transmission for reversibly driving a load, the combination of: a fluid motor coupled to said load and having a pair of ports; a reversible, variable displacement pump having a pair of ports, one communicating with each of said motor ports; a source of reference pressure; an actuator controlling the displacement of said pump, said actuator having a pair of opposed areas; and means for subjecting one of said areas to said reference pressure and the other of said areas to the fluid motor discharge pressure to modulate the reversal rate of said pump.

3. In a hydraulic power transmission for reversibly driving a load, the combination of: a fluid motor coupled to said load and having a pair of ports; a reversible, variable displacement pump having a pair of ports, one communicating with each of said motor ports; an adjustable source of reference pressure; and an actuator for controlling the displacement of said pump, said actuator being responsive to the differential between the fluid motor discharge pressure and the adjustable reference pressure to adjustably modulate the reversal rate of said pump.

4. In a hydraulic power transmission for reversibly driving a load, the combination of: a fluid motor coupled to said load and having a pair of ports; a reversible, variable displacement pump having a pair of ports, one communicating with each of said motor ports; a source of reference pressure; an actuator controlling the displacement of said pump, said actuator having a pair of opposed areas; pilot means responsive to load position to port said reference pressure to one of said areas; and means for conducting the fluid motor discharge pressure to the other of said areas, to thereby modulate the reversal rate of said pump.

References Cited in the file of this patent

UNITED STATES PATENTS 1,978,016    Ernst  ---------------- Oct. 23, 1934